(12) United States Patent
Sakabe et al.

(10) Patent No.: US 10,589,793 B2
(45) Date of Patent: Mar. 17, 2020

(54) PILLAR STRUCTURE FOR A VEHICLE

(71) Applicant: TOYOTA JIDOSHA KABUSHIKI KAISHA, Toyota-shi (JP)

(72) Inventors: Motoya Sakabe, Nisshin (JP); Takuya Miura, Toyota (JP); Koki Ikeda, Toyota (JP); Kazuki Furukawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/135,087

(22) Filed: Sep. 19, 2018

(65) Prior Publication Data

US 2019/0144042 A1    May 16, 2019

(30) Foreign Application Priority Data

Nov. 14, 2017    (JP) .................................. 2017-219305

(51) Int. Cl.
*B62D 25/04*    (2006.01)
*B62D 29/04*    (2006.01)
*B60J 1/00*    (2006.01)

(52) U.S. Cl.
CPC ........... *B62D 25/04* (2013.01); *B62D 29/043* (2013.01); *B60J 1/004* (2013.01)

(58) Field of Classification Search
CPC ......... B62D 25/04; B62D 29/043; B60J 1/004
USPC ................................................... 296/193.06
See application file for complete search history.

(56) References Cited

U.S. PATENT DOCUMENTS

| 1,593,005 | A | * | 7/1926 | Bailey | ...................... | B60J 10/70 |
| | | | | | | 296/193.06 |
| 1,784,265 | A | * | 12/1930 | Zeamans | ................ | B62D 25/04 |
| | | | | | | 296/200 |
| 1,894,383 | A | * | 1/1933 | Smith | ........................ | B60J 1/17 |
| | | | | | | 296/201 |
| 4,807,925 | A | * | 2/1989 | Sakamoto | ............ | B62D 23/005 |
| | | | | | | 296/193.06 |

(Continued)

FOREIGN PATENT DOCUMENTS

| GB | 2479363 A | 10/2011 |
| JP | 2005-96696 A | 4/2005 |

(Continued)

*Primary Examiner* — Gregory A Blankenship
(74) *Attorney, Agent, or Firm* — Oblon, McClelland, Maier & Neustadt, L.L.P.

(57) ABSTRACT

A pillar structure for a vehicle including: a pillar main body portion that is provided at a vehicle front portion and extends in a vehicle vertical direction, the pillar main body portion including a pair of pillar framework portions with chamber structures and a plate-shaped transparent member, the pair of pillar framework portions being disposed spaced apart in a vehicle front-and-rear direction, and the transparent member being attached to vehicle outer sides of the pair of pillar framework portions and isolating a vehicle cabin interior from a vehicle cabin exterior; and a reinforcing member provided with a pair of base portions and a transparent bridging portion, the base portions being respectively attached to vehicle inner sides of the pair of pillar framework portions and extending in the vehicle vertical direction along the pillar framework portions, and the bridging portion partially bridging between the pair of base portions.

6 Claims, 4 Drawing Sheets

(56) References Cited

U.S. PATENT DOCUMENTS

| | | | | |
|---|---|---|---|---|
| 5,941,596 | A * | 8/1999 | See | B60J 1/02 |
| | | | | 296/193.06 |
| 6,428,087 | B1 * | 8/2002 | Frasher | B60R 21/04 |
| | | | | 296/146.1 |
| 10,065,581 | B2 * | 9/2018 | Terada | B60R 13/08 |
| 10,150,512 | B2 * | 12/2018 | Toyota | B60J 1/004 |
| 2007/0194604 | A1 * | 8/2007 | Nygaard | B60R 21/13 |
| | | | | 296/187.09 |
| 2011/0248525 | A1 * | 10/2011 | Lundstroem | B62D 25/04 |
| | | | | 296/191 |
| 2015/0151796 | A1 | 6/2015 | Berger et al. | |
| 2016/0368537 | A1 | 12/2016 | Toyota | |
| 2017/0183039 | A1 * | 6/2017 | Toyota | B62D 25/04 |
| 2017/0239883 | A1 * | 8/2017 | Terada | B62D 29/04 |
| 2017/0240210 | A1 * | 8/2017 | Terada | B62D 29/043 |
| 2017/0240211 | A1 * | 8/2017 | Terada | B60J 1/006 |
| 2017/0253275 | A1 * | 9/2017 | Terada | B62D 29/04 |
| 2018/0273102 | A1 * | 9/2018 | Komoriya | B62D 25/04 |
| 2018/0273104 | A1 * | 9/2018 | Ikeda | B62D 25/04 |
| 2018/0273106 | A1 * | 9/2018 | Ikeda | B62D 29/04 |
| 2019/0039553 | A1 * | 2/2019 | Komura | B60J 10/7775 |
| 2019/0126985 | A1 * | 5/2019 | Ikeda | B62D 25/04 |
| 2019/0144042 | A1 * | 5/2019 | Sakabe | B62D 25/04 |
| | | | | 296/203.02 |
| 2019/0217899 | A1 * | 7/2019 | Ikeda | B62D 25/02 |
| 2019/0217900 | A1 * | 7/2019 | Ikeda | B60J 1/10 |
| 2019/0225275 | A1 * | 7/2019 | Miura | B60J 1/02 |
| 2019/0233018 | A1 * | 8/2019 | Tanaka | B60R 21/213 |

FOREIGN PATENT DOCUMENTS

| | | |
|---|---|---|
| JP | 2006-273057 | 10/2006 |
| JP | 2017-007509 | 1/2017 |

\* cited by examiner

PILLAR STRUCTURE FOR A VEHICLE

CROSS-REFERENCE TO RELATED APPLICATION

This application is based on and claims priority under 35 USC 119 from Japanese Patent Application No. 2017-219305 filed on Nov. 14, 2017, the disclosure of which is incorporated by reference herein.

BACKGROUND

Technical Field

The present disclosure relates to a pillar structure for a vehicle.

Related Art

Japanese Patent Application Laid-Open (JP-A) No. 2006-273057 discloses a front pillar constituted by a transparent material retained by a retaining member. JP-A No. 2017-007509 discloses a front pillar that is fabricated of reinforced resin and formed to be transparent.

In JP-A Nos. 2006-273057 and 2017-007509, because a pillar itself is formed of a transparent material, blind spots for a vehicle occupant may be reduced. However, in order to assure stiffness, a thickness of the transparent material must be made thick. As a result, a view outside the vehicle seen through the pillar may appear distorted.

Thus, there is scope for improvement.

SUMMARY

In consideration of the circumstances described above, the present disclosure provides a pillar structure for a vehicle that may improve visibility while assuring stiffness.

A pillar structure for a vehicle according to a first aspect of the present disclosure includes: a pillar main body portion that is provided at a vehicle front portion and extends in a vehicle vertical direction, the pillar main body portion including a pair of pillar framework portions with chamber structures and a plate-shaped transparent member, the pair of pillar framework portions being disposed spaced apart in a vehicle front-and-rear direction, and the transparent member being attached to vehicle outer sides of the pair of pillar framework portions and isolating a vehicle cabin interior from a vehicle cabin exterior; and a reinforcing member provided with a pair of base portions and a transparent bridging portion, the base portions being respectively attached to the vehicle inner sides of the pair of pillar framework portions and extending in the vehicle vertical direction along the pillar framework portions, and the bridging portion partially bridging between the pair of base portions.

In the pillar structure for a vehicle according to the first aspect of the present disclosure, the pillar main body portion is structured to include the pair of pillar framework portions and the transparent member. The pair of pillar framework portions are provided at the vehicle front portion and extend in the vehicle vertical direction. The pair of pillar framework portions are disposed spaced apart in the vehicle front-and-rear direction and are each structured as a chamber. The plate-shaped transparent member is attached to the vehicle outer sides of the pair of pillar framework portions. The vehicle cabin interior is isolated from the vehicle cabin exterior by this transparent member. Therefore, a vehicle occupant inside the vehicle cabin may see outside the vehicle through the transparent member.

The reinforcing member is attached to the pillar framework portion. The reinforcing member is provided with the base portions that are attached to the corresponding vehicle inner sides of the pair of pillar framework portions. The pair of base portions extend in the vehicle vertical direction along the corresponding pillar framework portions. The pair of base portions are partially bridged together by the transparent bridging portion. Because the pair of pillar framework portions are connected by the bridging portion of the reinforcing member, stiffness of the pillar main body portion may be assured. In addition, when the outside of the vehicle is seen through a region in which the bridging portion is not provided, the outside of the vehicle may be seen through only the transparent member.

In a pillar structure for a vehicle according to a second aspect of the present disclosure, in the first aspect, a plural number of the bridging portion is provided spaced apart along the base portions.

In the pillar structure for a vehicle according to the second aspect of the present disclosure, stiffness may be raised compared to a structure in which only a single bridging portion is provided.

In a pillar structure for a vehicle according to a third aspect of the present disclosure, in the first aspect or the second aspect, an inflected portion is formed at a lower end portion of a pillar framework portion that, of the pair of pillar framework portions, is disposed at a vehicle rear side, and one end portion of the bridging portion is connected at the inflected portion.

In the pillar structure for a vehicle according to the third aspect of the present disclosure, the inflected portion, which is likely to be a start point of buckling when a load is applied, may be reinforced by the bridging portion.

In a pillar structure for a vehicle according to a fourth aspect of the present disclosure, in any one of the first to third aspects, each of the pair of pillar framework portions includes a first face and a second face, the first faces facing a vehicle cabin interior side thereof and the base portions being attached to the first faces, and the second faces opposing one another, and both of end portions of the bridging portion are in contact with the second faces.

In the pillar structure for a vehicle according to the fourth aspect of the present disclosure, the two end portions of the bridging portion are in contact with the second faces of the pillar framework portions that oppose one another. Therefore, when a load is applied in a direction that makes the pillar framework portions approach one another, the bridging portion may brace the load and deformation of the pillar framework portions may be suppressed.

As described above, according to the pillar structure for a vehicle according to the first aspect of the present disclosure, excellent effects are provided in that visibility may be improved while stiffness is assured.

According to the pillar structure for a vehicle according to the second aspect of the present disclosure, an excellent effect is provided in that stiffness of the pillar main body portion may be raised.

According to the pillar structure for a vehicle according to the third aspect of the present disclosure, an excellent effect is provided in that stiffness of the pillar main body portion may be raised effectively.

According to the pillar structure for a vehicle according to the fourth aspect of the present disclosure, an excellent effect is provided in that deformation of the pillar framework portions may be suppressed.

BRIEF DESCRIPTION OF THE DRAWINGS

Exemplary embodiments of the present disclosure will be described in detail based on the following figures, wherein.

DETAILED DESCRIPTION

Figure 1:
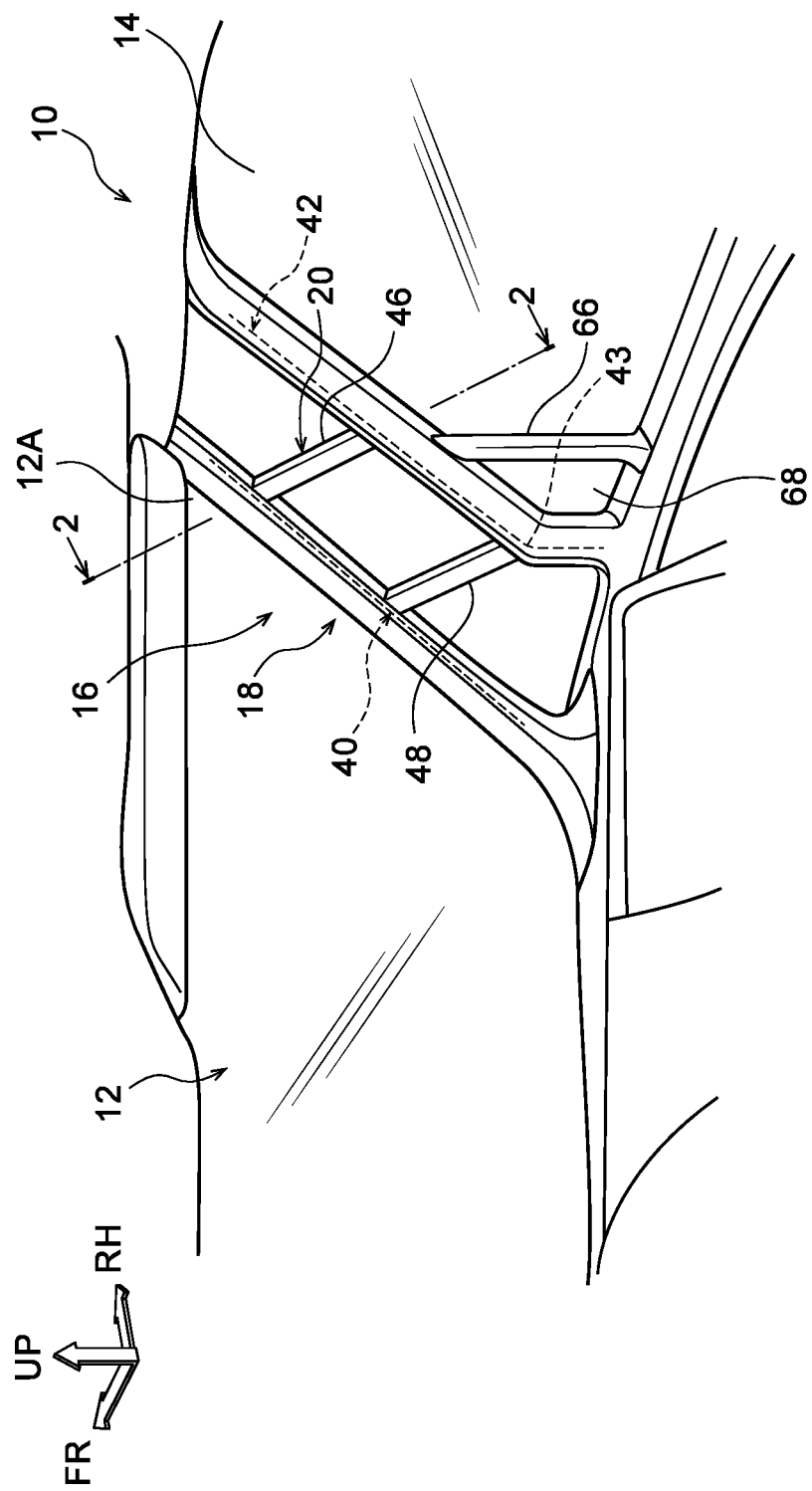
FIG. 1 is a perspective view, seen from a vehicle cabin interior side, of a vehicle front portion at which a pillar structure for a vehicle according to an exemplary embodiment is employed.

Herebelow, a pillar structure for a vehicle according to an exemplary embodiment is described with reference to the attached drawings. An arrow FR that is shown where appropriate in the drawings indicates a vehicle front side, an arrow UP indicates a vehicle upper side, and an arrow RH indicates a vehicle width direction right side.

As shown in FIG. 1, a windshield glass 12 is disposed at a front portion of a vehicle 10 in which the pillar structure for a vehicle according to the present exemplary embodiment is employed. The windshield glass 12 is formed of a transparent plate of glass, which extends in the vehicle vertical direction in a vehicle side view. A front side glass 14 is disposed at the vehicle right side of the front portion of the vehicle 10.

The front side glass 14 is formed of a transparent plate of glass and extends in the vehicle vertical direction along a right side face at the vehicle front. A front pillar 16 is provided between the windshield glass 12 and the front side glass 14. Although not shown in the drawings, a front side glass similar to the front side glass 14 is also provided at the vehicle left side of the front portion of the vehicle 10, and a front pillar is provided between the front side glass at the vehicle left side and the windshield glass 12. In the present exemplary embodiment, the front pillar at the vehicle left side and the front pillar 16 at the vehicle right side are structures that are symmetrical between left and right. Accordingly, only the front pillar 16 at the vehicle right side is described; descriptions of the front pillar at the vehicle left side are not given.

Figure 2:
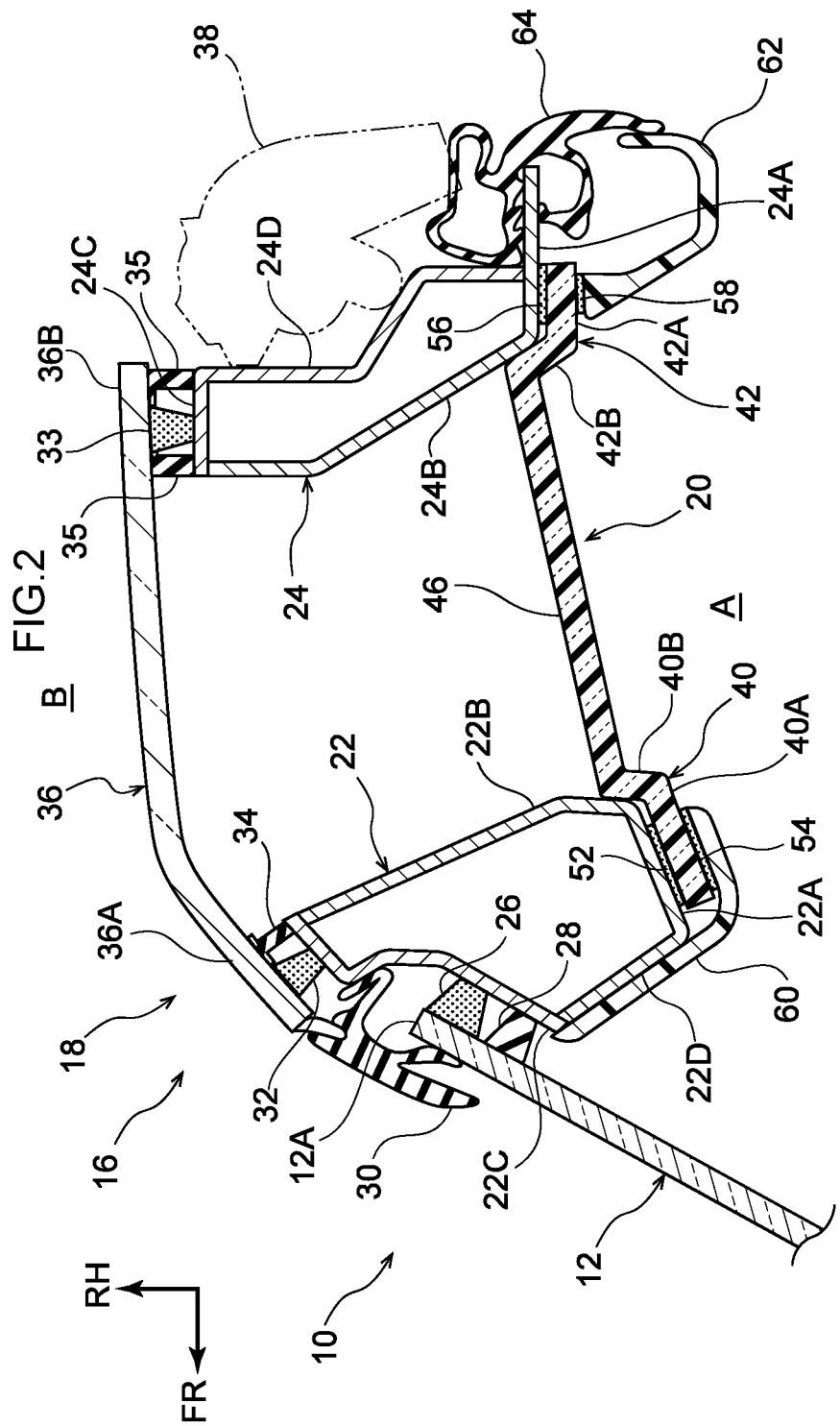
FIG. 2 is a sectional diagram showing a state cut along line 2-2 in FIG. 1.

The front pillar 16 extends in the vehicle vertical direction along a vehicle width direction end portion 12A of the windshield glass 12. The front pillar 16 is angled to the vehicle rear side toward the vehicle upper side. As shown in FIG. 2, the front pillar 16 principally includes a pillar main body portion 18 and a reinforcing member 20.

The pillar main body portion 18 is provided with a first column 22 and a second column 24 that serve as pillar framework portions. The first column 22 and the second column 24 are disposed spaced apart in the vehicle front-and-rear direction. The first column 22 extends substantially in the vehicle vertical direction and is structured as a chamber including a first face 22A, a second face 22B, a third face 22C and a fourth face 22D. The first face 22A faces to a vehicle cabin interior A side in a plan sectional view (to the vehicle rear side and the vehicle left side). The second face 22B faces to the vehicle rear side and the vehicle right side so as to oppose the second column 24, which is described below. The third face 22C faces to a vehicle cabin exterior B side (the vehicle front side and the vehicle right side). The fourth face 22D faces to the vehicle front side and the vehicle left side.

The vehicle left side of the third face 22C of the first column 22 is recessed to an inner side thereof relative to the vehicle right side of the third face 22C. The vehicle width direction end portion 12A of the windshield glass 12 is joined to the third face 22C via an adhesive 26 in this recessed region. A cushion rubber 28 is attached at the vehicle left side (the vehicle cabin interior A side) of the adhesive 26. A gap between the first column 22 and the windshield glass 12 is sealed by the cushion rubber 28. A windshield molding 30 is provided at the vehicle outer side of the vehicle width direction end portion 12A of the windshield glass 12.

A transparent plate member 36 that serves as a transparent member, which is described below, is joined to the vehicle right side of the third face 22C via an adhesive 32. A cushion rubber 34 is attached at the vehicle rear side (the vehicle cabin interior A side) of the adhesive 32. A gap between the first column 22 and the transparent plate member 36 is sealed by the cushion rubber 34.

The second column 24 is provided to be spaced apart from the first column 22 at the vehicle rear side relative to the first column 22. The second column 24 extends in the vehicle vertical direction similarly to the first column 22 and is structured as a chamber including a first face 24A, a second face 24B, a third face 24C and a fourth face 24D. The first face 24A faces to the vehicle cabin interior A side (the vehicle left side) in a chamber view. The second face 24B faces to the vehicle front side and the vehicle left side so as to oppose the second face 22B of the first column 22. The third face 24C faces to the vehicle cabin exterior B side (the vehicle right side). The fourth face 24D faces to the vehicle rear side.

The transparent plate member 36 is joined to the third face 24C of the second column 24 via an adhesive 33. Respective cushion rubbers 35 are attached at the vehicle front and rear of the adhesive 33. A gap between the second column 24 and the transparent member 36 is sealed by the cushion rubbers 35.

The transparent plate member 36 is formed in a plate shape of an inorganic glass, a transparent resin or the like. The vehicle cabin interior A is isolated from the vehicle cabin exterior B by the transparent plate member 36. The transparent plate member 36 is attached to the vehicle outer sides of the first column 22 and the second column 24. To be specific, one end portion 36A of the transparent plate member 36 is joined to the third face 22C of the first column 22, and another end portion 36B of the transparent plate member 36 is joined to the third face 24C of the second column 24. The meaning of the term "transparent" as used herein is not limited to a constitution that completely transmits light without haziness but is intended to include constitutions that are hazy to an extent that allows viewing of the side beyond the transparent plate member 36. The reference symbol 38 indicating the two-dot chain lines in the drawing refers to a door frame that is provided along the vehicle rear side of the second column 24.

Figure 3:
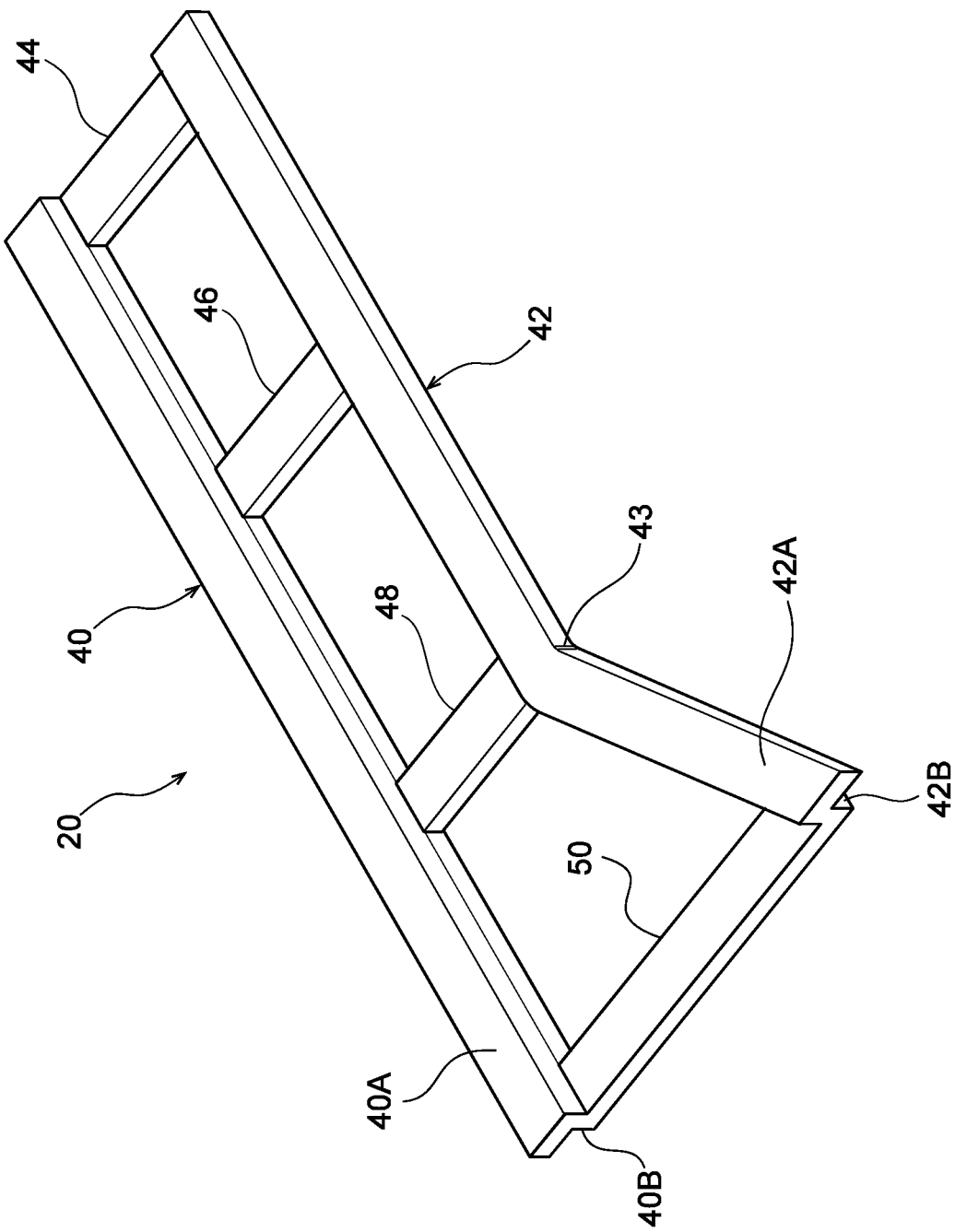
FIG. 3 is a perspective view showing a reinforcing member that structures the pillar structure for a vehicle according to the exemplary embodiment.

The reinforcing member 20 is joined to the first face 22A of the first column 22 and the first face 24A of the second column 24. As shown in FIG. 3, the reinforcing member 20 includes a front side base portion 40 and a rear side base portion 42 that serve as a pair of base portions, and bridging portions 44, 46, 48 and 50. As an example in the present exemplary embodiment, the front side base portion 40, the rear side base portion 42, and the bridging portions 44, 46, 48 and 50 are formed of a transparent resin.

The front side base portion 40 is a portion that is disposed at the vehicle front side when the reinforcing member 20 is attached to the pillar main body portion 18, and is formed in a long, narrow shape along the first column 22 with a length direction in the vehicle vertical direction. A cross section of the front side base portion 40 cut along a direction orthogonal to the length direction thereof is formed substantially in an "L" shape, the front side base portion 40 being provided with a front side lateral wall portion 40A and a front side longitudinal wall portion 40B. As shown in FIG. 2, the front side lateral wall portion 40A is joined to the first face 22A of the first column 22 via an adhesive 52. The front side longitudinal wall portion 40B is inserted into the space between the first column 22 and the second column 24 and is in contact with an end portion at the vehicle cabin interior A side of the second face 22B of the first column 22.

The rear side base portion 42 is provided at the vehicle rear side relative to the front side base portion 40. As shown in FIG. 3, the rear side base portion 42 is formed in a long, narrow shape along the second column 24 with a length direction in the vehicle vertical direction. A cross section of the rear side base portion 42 cut along a direction orthogonal to the length direction thereof is formed substantially in an "L" shape, the rear side base portion 42 being provided with a rear side lateral wall portion 42A and a rear side longitudinal wall portion 42B. As shown in FIG. 2, the rear side lateral wall portion 42A is joined to the first face 24A of the second column 24 via an adhesive 56. The rear side longitudinal wall portion 42B is inserted into the space between the first column 22 and the second column 24 and is in contact with an end portion at the vehicle cabin interior A side of the second face 24B of the second column 24.

As shown in FIG. 3, an inflected portion 43 is formed at a portion of the rear side base portion 42 that is offset to the lower side relative to a length direction central portion of the rear side base portion 42. The upper side of the rear side base portion 42 relative to the inflected portion 43 extends substantially in parallel with the front side base portion 40. However, the lower side of the rear side base portion 42 relative to the inflected portion 43 is shaped to be angled in a direction that gradually increases the separation between the rear side base portion 42 and the front side base portion 40 toward an end portion at the lower side of the rear side base portion 42.

The front side base portion 40 and the rear side base portion 42 are bridged between by the plural bridging portions 44, 46, 48 and 50. Each of the bridging portions 44, 46, 48 and 50 extends perpendicularly with respect to the front side base portion 40. The bridging portion 44 connects the front side longitudinal wall portion 40B at an upper end portion of the front side base portion 40 with the rear side longitudinal wall portion 42B at an upper end portion of the rear side base portion 42.

The bridging portion 46 is spaced apart from the bridging portion 44 and disposed at the lower side of the bridging portion 44, and the bridging portion 46 connects the front side longitudinal wall portion 40B of the front side base portion 40 with the rear side longitudinal wall portion 42B of the rear side base portion 42. Similarly, the bridging portion 48 is spaced apart from the bridging portion 46 and disposed at the lower side of the bridging portion 46. The bridging portion 48 connects the front side longitudinal wall portion 40B of the front side base portion 40 with the rear side longitudinal wall portion 42B at the inflected portion 43 of the rear side base portion 42. That is, a rear end portion (one end portion) of the bridging portion 48 is connected at the inflected portion 43. The bridging portion 50 is spaced apart from the bridging portion 48 and disposed at the lower side of the bridging portion 48, and the bridging portion 50 connects the front side longitudinal wall portion 40B at a lower end portion of the front side base portion 40 with the rear side longitudinal wall portion 42B at a lower end portion of the rear side base portion 42. Thus, the front side base portion 40 and rear side base portion 42 are partially bridged between by the plural bridging portions 44, 46, 48 and 50.

As shown in FIG. 2, a front side pillar garnish 60 is joined to a face at the vehicle cabin interior A side of the front side base portion 40 via an adhesive 54. The front side pillar garnish 60 extends along the first column 22 with a length direction in the vehicle vertical direction. A cross section of the front side pillar garnish 60 cut along a direction orthogonal to the length direction thereof is formed substantially in an "L" shape. The first face 22A and fourth face 22D of the first column 22 are covered from the vehicle cabin interior A side thereof by the front side pillar garnish 60.

A rear side pillar garnish 62 is joined to a face at the vehicle cabin interior A side of the rear side base portion 42 via an adhesive 58. The rear side pillar garnish 62 extends along the second column 24 with a length direction in the vehicle vertical direction. A cross section of the rear side pillar garnish 62 cut along a direction orthogonal to the length direction thereof is formed substantially in a "U" shape. The first face 24A of the second column 24 is covered from the vehicle cabin interior A side thereof by the rear side pillar garnish 62. The first face 24A of the second column 24 protrudes to the vehicle rear side relative to a connecting portion thereof with the fourth face 24D. A weatherstrip 64 is attached to this protruding region.

As shown in FIG. 1, the front pillar 16 and a side door main body are separated by a separating member 66 that extends in the vehicle vertical direction. A region of the front side glass 14 between the separating member 66 and the front pillar 16 serves as a fixed-type triangular window 68.

Operation and Effects

Now, operation and effects of the present exemplary embodiment are described.

In the present exemplary embodiment, as shown in FIG. 2, the first column 22 and second column 24 forming the pillar main body portion 18 are each structured as chambers. The transparent plate member 36 is attached to the third face 22C of the first column 22 and the third face 24C of the second column 24. The vehicle cabin interior A and the vehicle cabin exterior B are isolated by the transparent plate member 36. Thus, a vehicle occupant in the vehicle cabin interior A may see outside the vehicle through the transparent plate member 36.

The reinforcing member 20 is attached to the first column 22 and the second column 24, and the reinforcing member 20 is provided with the front side base portion 40 that is joined to the first column 22 and the rear side base portion 42 that is joined to the second column 24. The front side base portion 40 and the rear side base portion 42 are partially bridged between by the bridging portions 44, 46, 48 and 50. Thus, because the vehicle cabin interior A sides of the first column 22 and second column 24 are reinforced by the reinforcing member 20, stiffness of the pillar main body portion 18 may be assured.

In the present exemplary embodiment, because the reinforcing member 20 is formed of a transparent resin, a field of view of the vehicle occupant is not obstructed by the reinforcing member 20. In particular, as shown in FIG. 3, the outside of the vehicle may be seen through only the transparent plate member 36 in regions at which the bridging portions 44, 46, 48 and 50 are not provided. That is, the outside of the vehicle may be seen through only the transparent plate member 36 between the bridging portion 44 and the bridging portion 46, between the bridging portion 46 and the bridging portion 48, and between the bridging portion 48 and the bridging portion 50. Thus, visibility may be improved while stiffness of the front pillar 16 is assured.

In the present exemplary embodiment, because the plural bridging portions 44, 46, 48 and 50 are provided, stiffness of the front pillar 16 may be raised compared to a structure in which only the single bridging portion 46 is provided.

In the present exemplary embodiment, as shown in FIG. 1, the inflected portion 43 is formed at the rear side base portion 42 of the reinforcing member 20, and the bridging portion 48 is connected at the location of the inflected portion 43. Therefore, the inflected portion 43, which is likely to be a start point of buckling when a load is applied, may be reinforced and the stiffness of the front pillar 16 may be raised effectively.

In the present exemplary embodiment, as shown in FIG. 2, the front side longitudinal wall portion 40B of the front side base portion 40 and the rear side longitudinal wall portion 42B of the rear side base portion 42 are inserted into the space between the first column 22 and the second column 24. Therefore, both of end portions of the bridging portion 46 are in states of contact with the second face 22B of the first column 22 and the second face 24B of the second column 24. Thus, if a load is applied in a direction that makes the first column 22 and second column 24 approach one another, the bridging portion 46 may brace the load and deformation of the front pillar 16 may be suppressed. The bridging portions 44, 48 and 50 have similar structures and therefore may further suppress deformation of the front pillar 16.

Above, a pillar structure for a vehicle according to the exemplary embodiment has been described, but it will be clear that numerous modes may be embodied within a scope that does not depart from the gist of the present disclosure. For example, as in the variant example shown in FIG. 4, the angles of the bridging portions 46 and 48 may be altered.

Variant Example

Figure 4:
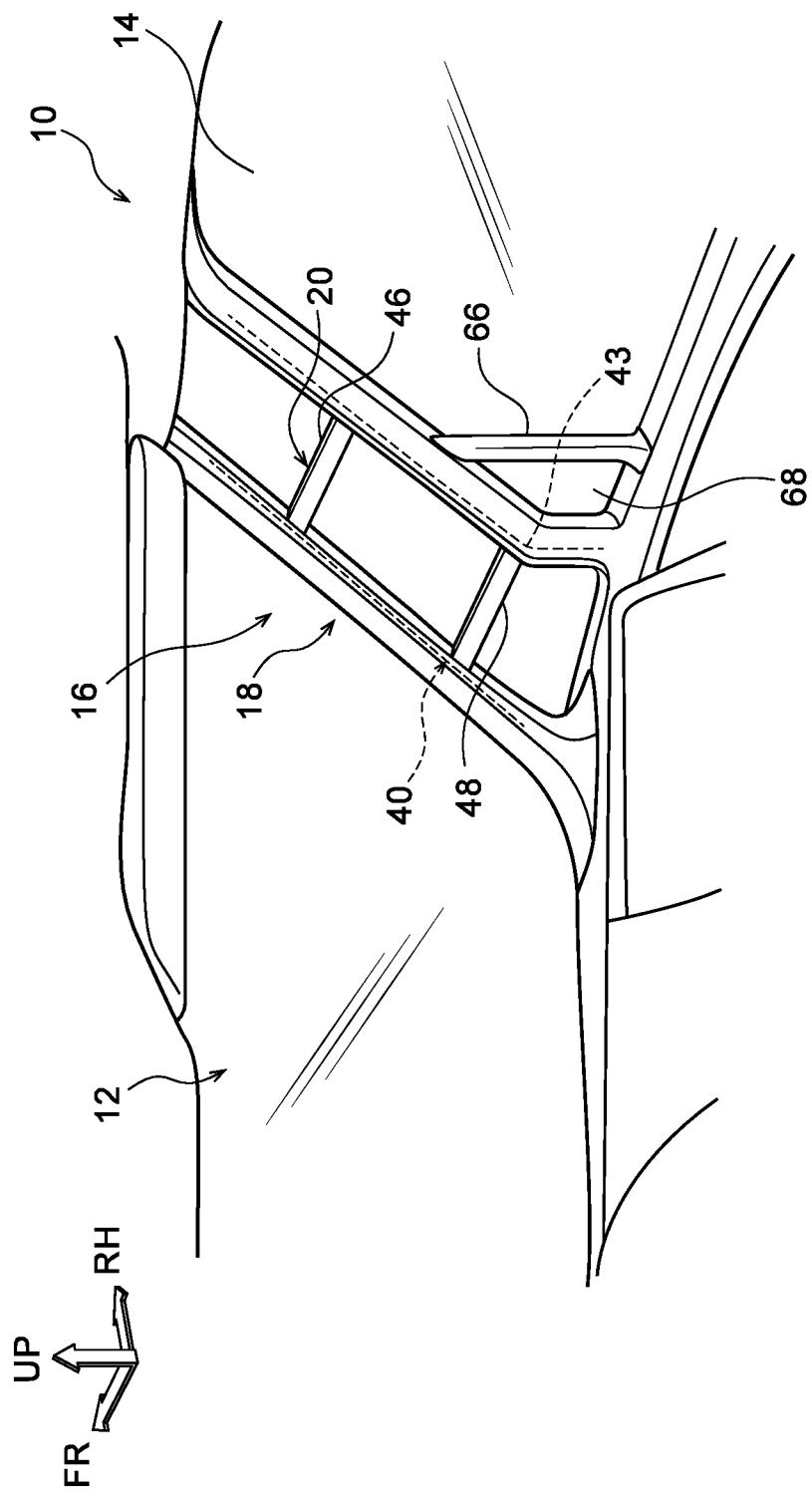
FIG. 4 is a perspective view, corresponding to FIG. 1, showing a variant example of the pillar structure for a vehicle according to the exemplary embodiment.

As shown in FIG. 4, the present variant example is structured similarly to the exemplary embodiment except for the bridging portion 46 and the bridging portion 48. The bridging portion 46 connects the front side base portion 40 with the rear side base portion 42 and extends horizontally. The bridging portion 48 is provided substantially in parallel with the bridging portion 46, extends horizontally, and connects the front side base portion 40 with the rear side base portion 42.

Because the bridging portion 46 and the bridging portion 48 extend horizontally as described above, obstructed regions of the field of view may be smaller in the vertical direction than in a structure in which, as in the exemplary embodiment shown in FIG. 1, the bridging portions 46 and 48 extend perpendicularly with respect to the front side base portion 40.

However, the structure in which the bridging portions 46 and 48 extend perpendicularly with respect to the front side base portion 40 may have higher stiffness. Therefore, for example, the structures in FIG. 1 and the structures in FIG. 4 may be combined. To be specific, the bridging portion 46 may extend horizontally and the bridging portion 48 may extend perpendicularly with respect to the front side base portion 40.

In the present exemplary embodiment, the whole of the reinforcing member 20 is formed of a transparent resin, but this is not limiting. For example, in FIG. 3, it may be that only the bridging portions 46 and 48 are formed of a transparent resin and other portions of the reinforcing member 20 are formed of a non-transparent reinforced resin or the like. In this case, because portions of the reinforcing member 20 other than the bridging portions 46 and 48 are portions that do not impinge on the field of view of a vehicle occupant, the effect of improving visibility for the vehicle occupant may be provided similarly to the present exemplary embodiment.

What is claimed is:

1. A pillar structure for a vehicle, the pillar structure comprising:
   a pillar main body portion that is provided at a vehicle front portion and extends in a vehicle vertical direction, the pillar main body portion including a pair of pillar framework portions with chamber structures and a plate-shaped transparent member, the pair of pillar framework portions being disposed spaced apart in a vehicle front-and-rear direction, and the transparent member being attached to vehicle outer sides of the pair of pillar framework portions and isolating a vehicle cabin interior from a vehicle cabin exterior; and
   a reinforcing member provided with a pair of base portions and a transparent bridging portion, the base portions being respectively attached to vehicle inner sides of the pair of pillar framework portions and extending in the vehicle vertical direction along the pillar framework portions, and the bridging portion partially bridging between the pair of base portions,
   wherein a plurality of the bridging portions is provided spaced apart along the base portions.

2. The pillar structure for a vehicle according to claim 1, wherein:
   an inflected portion is formed at a lower end portion of a pillar framework portion that, of the pair of pillar framework portions, is disposed at a vehicle rear side; and
   one end portion of the bridging portion is connected at the inflected portion.

3. The pillar structure for a vehicle according to claim 1, wherein:
   each of the pair of pillar framework portions includes a first face and a second face, the first faces facing a vehicle cabin interior side thereof and the base portions being attached to the first faces, and the second faces opposing one another; and
   both end portions of the bridging portion are in contact with the second faces.

4. The pillar structure for a vehicle according to claim 1, wherein the plurality of bridging portions extend substantially in parallel with each other.

5. The pillar structure for a vehicle according to claim 1, wherein each of the plurality of bridging portions extends perpendicularly with respect to the base portions.

6. The pillar structure for a vehicle according to claim 1, wherein each of the plurality of bridging portions extends horizontally.

* * * * *